Max Shaw
INVENTOR.

BY
ATTORNEY

April 9, 1957 M. SHAW 2,788,476
PULSE PROPORTIONAL SERVOMOTOR CONTROL SYSTEM
Filed Sept. 23, 1952 3 Sheets-Sheet 2

Max Shaw
INVENTOR.
BY
ATTORNEY

April 9, 1957 M. SHAW 2,788,476
PULSE PROPORTIONAL SERVOMOTOR CONTROL SYSTEM
Filed Sept. 23, 1952 3 Sheets-Sheet 3
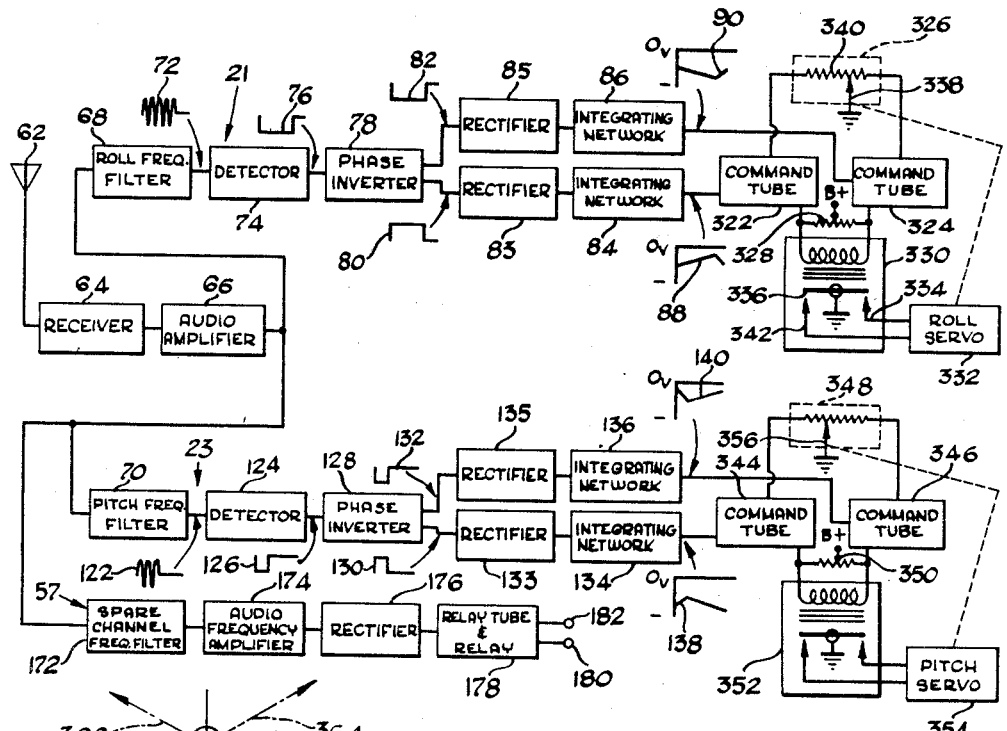
*Fig. 4.*
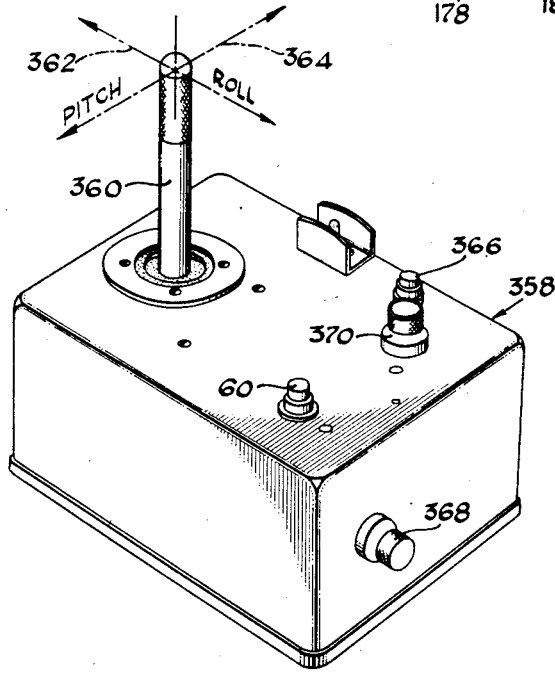
*Fig. 5.*
MAX SHAW
INVENTOR.
BY 
ATTORNEY United States Patent Office 2,788,476
Patented Apr. 9, 1957

2,788,476

PULSE PROPORTIONAL SERVOMOTOR CONTROL SYSTEM

Max Shaw, Los Angeles, Calif.

Application September 23, 1952, Serial No. 311,125

21 Claims. (Cl. 318—28)

My present invention relates to electronic remote control systems, and more particularly to an electronic remote control system wherein proportional control is achieved.

One of the principal difficulties which has existed in prior art remote control systems for controlling target aircraft, guided missiles or airplanes is that the deflection of the controlled surfaces of the aircraft was not proportional to the amount of deflection of the control lever in the hands of the operator. Also, in prior art remote control systems, the rate at which the controlled surfaces of the plane moved did not correspond to the rate at which the operating lever was moved.

Another difficulty encountered in prior art remote control systems was that control by these prior art mechanisms was not accurate. For example, "trim" could not be applied to the aircraft surfaces while the craft was flying.

A further problem in the prior art was that the simultaneous operation in a remote control mechanism of two or more remote control channels was not possible.

In view of these and many other difficulties which were found in prior art remote control systems, it is an object of my invention to produce an electronic remote control system for aircraft which accurately controls the aircraft surfaces in proportion to the amount of deflection which the operator applies to the control mechanism.

Another object of my invention is to produce a remote control system for aircraft in which the controlled surfaces of the aircraft are moved at a rate substantially corresponding to the rate of movement of the control mechanism in the hands of the operator.

Another object of my invention is to produce a remote control system for aircraft which is so accurate that "trim" can be applied to the aircraft surfaces while the craft is in flight.

Other objects and advantages of my invention will be apparent from the following description and claims, the novelty consisting in the features of construction, combination of parts, and the unique relations of the members and the relative proportioning, disposition and operation thereof, all as is more completely outlined herein and as is particularly pointed out in the appended claims.

In the drawings, forming a part of the present application,

Figure 4 is a block diagram of an alternative embodiment of my air control unit, and Figure 5 is a perspective view of my "stick box" which is used in connection with my ground control unit.

Figure 1:
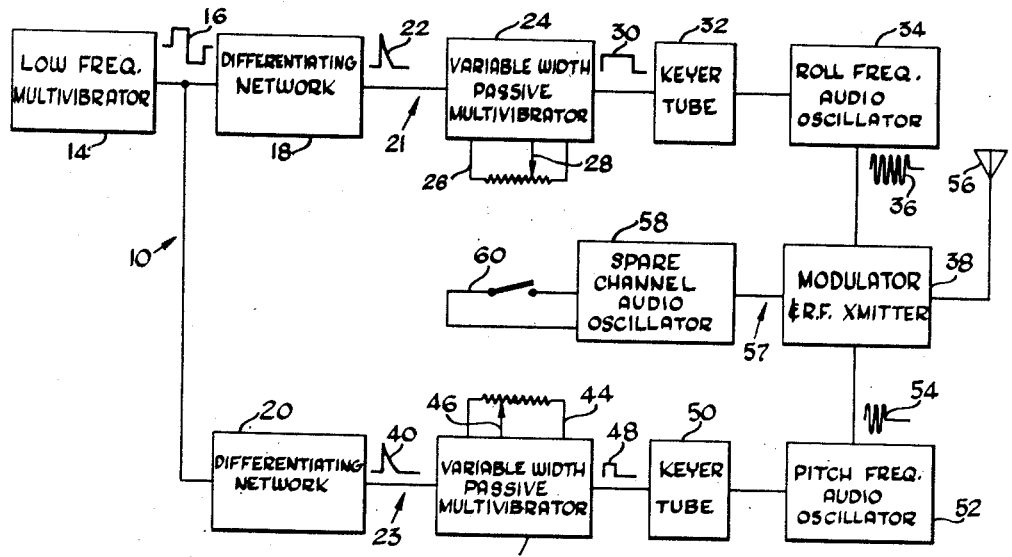
Figure 1 is a block diagram of my ground control unit.
Figure 2:
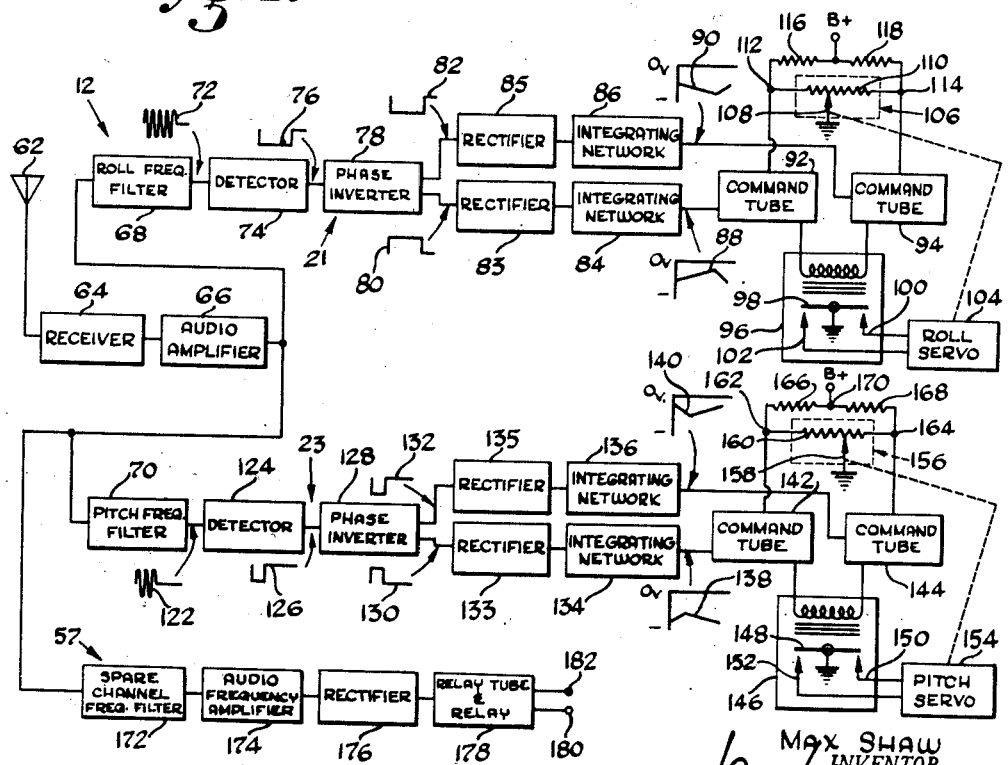
Figure 2 is a block diagram of my air control unit.

Referring to the drawings, my pulse proportional control system comprises generally a ground control unit 10, which is shown in block diagram in Figure 1, and an air control unit 12, which is shown in block diagram in Figure 2.

Referring now to the block diagram of my ground control unit 10, which is shown in Figure 1, I provide a low frequency multivibrator 14 which produces a low frequency duty cycle square wave 16 having substantially equal positive and negative half-cycles. I prefer to set my low frequency multivibrator 14 at a frequency of about 15 cycles per second.

Square wave 16 enters a pair of differentiating networks 18 and 20, which are the first circuit elements in roll control channel 21 and pitch control channel 23, respectively. Channels 21 and 23 include the respective roll and pitch control elements of both ground control unit 10 and air control unit 12.

Referring now to my roll control channel 21, differentiating network 18, which may include a wave shaping tube in addition to the differentiating circuit elements, produces a wave shape in the form of a positive spike 22. The frequency of low frequency multivibrator 14 determines the recurrence frequency of spike 22.

Spike 22 triggers a variable width passive multivibrator 24 having a roll control potentiometer 26 associated therewith. Movement of arm 28 of roll control potentiometer 26 causes a variation in the relative sizes of the positive and negative portions of rectangular wave 30 produced by variable width passive multivibrator 24. Thus, movement of potentiometer arm 28 to the right in Figure 1 will produce a long positive portion of rectangular wave 30 and a short negative portion of rectangular wave 30, which is the condition illustrated in Figure 1, whereas movement of potentiometer arm 28 to the left will produce a relatively short positive portion of wave 30 and a relatively long negative portion of wave 30. When potentiometer arm 28 is centralized the positive and negative portions of wave 30 are equalized.

Rectangular wave 30 enters a keyer tube 32 which acts as a buffer to prevent any reflection back to multivibrator 24 and which also provides sufficient power so that rectangular wave 30 will key off roll frequency audio oscillator 34. Audio oscillator 34 will oscillate during the positive portion of rectangular wave 30, and will be completely cut off during the negative portion of rectangular wave 30. Thus, the output of roll frequency audio oscillator 34 will be a proportion modulated audio wave 36. Since the positive portion of the rectangular wave 30 illustrated in Figure 1 is longer than the negative portion of wave 30, the portion of wave 36 having audio modulations will be longer than the portion of wave 36 having no audio modulations.

A radio frequency wave is modulated with proportion modulated audio wave 36 in modulator and R. F. transmitter 38. The R. F. transmitter in unit 38 may either be amplitude modulated or frequency modulated.

Pitch control channel 23 operates in exactly the same manner as roll control channel 21. Thus, the output of differentiating network 20 is a positive spike 40 which triggers variable width passive multivibrator 42. Adjustment of pitch control potentiometer 44 by means of arm 46 determines the relative lengths of the positive and negative portions of rectangular wave 48 which is produced by variable width passive multivibrator 42. In Figure 1 potentiometer arm 46 has been moved to the left, so that rectangular wave 48 has a short positive portion and a long negative portion.

Rectangular wave 48 is applied to keyer tube 50, which in turn keys off pitch frequency audio oscillator 52. The output of pitch frequency audio oscillator 52 is proportion modulated audio wave 54 which has a short portion of pitch frequency audio oscillations and a long portion without these audio oscillations.

The radio frequency carrier of modulator and R. F. transmitter 38 is modulated with audio wave 54, so that the radio frequency carrier now is modulated by two audio waves, the roll frequency audio wave 36 and the pitch frequency audio wave 54. This modulated radio frequency carrier is transmitted through antenna 56.

Although I have shown only two channels, roll control channel 21 and pitch control channel 23, I can provide any desired number of channels which utilize different audio frequencies to permit the remote control of any movable part of an aircraft.

If an on-off control is desired instead of a proportional control, or in addition to the proportional control, I provide a spare channel 57 that includes audio oscillator 58 which has a different frequency than either roll frequency audio oscillator 34 or pitch frequency audio oscillator 52. Audio oscillator 58 will apply a continuous audio frequency modulation to the radio frequency carrier of modulator and R. F. transmitter 38 when switch 60 is closed. On the other hand, audo oscillator 58 will not apply any audio frequency modulations to the radio frequency carrier when switch 60 is open.

Turning now to my air control unit 12 which is shown in block diagram in Figure 2, the radio frequency carrier which was sent out by ground control unit 10 through antenna 56 is picked up by air control unit input antenna 62 and is conveyed to receiver 64, which may be an A. M. or an F. M. receiver according to the type of transmitter used in ground control unit 10. The audio output of receiver 64 is amplified by audio amplifier 66, which applies the combined audio waves 36 and 54 to roll frequency filter 68 and pitch frequency filter 70, respectively.

The portion of roll control channel 21 which forms a part of air control unit 12 will now be described. Roll frequency filter 68 admits roll frequency audio oscillations and rejects all pitch and extraneous frequency oscillations. Thus, the output of roll frequency filter 68 is proportion modulated audio wave 72.

Audio wave 72 is fed into a rectangular wave detector 74 which extracts the rectangular wave from proportion modulated audio wave 72, producing rectangular wave 76. Rectangular wave 76 corresponds to rectangular wave 30, being reversed in phase due to the action of detector 74.

Rectangular wave 76 is fed into a phase inverter 78, which applies uninverted and inverted waves 80 and 82, respectively, to rectifiers 83 and 85, which rectify the wave forms and pass them on to integrating networks 84 and 86, respectively.

Integrating networks 84 and 86 respectively produce relatively positive and negative direct current voltages at their outputs. However, integrating networks 84 and 86 do not completely integrate the wave forms 80 and 82, respectively, to direct current, but allow small portions of the alternations of waves 80 and 82 to pass. Thus, the output of integrating network 84 is a wave shape 88 which is relatively positive with slight fluctuations, and the output of integrating network 86 is wave 90, which is relatively negative with slight fluctuations. The purpose of the small fluctuations in waves 88 and 90 is to provide a "dither" voltage which will be hereinafter described.

If rectangular wave 30 had a short positive portion and a long negative portion, wave 88 would be a relatively negative direct current voltage and wave 90 would be a relatively positive direct current voltage, instead of being relatively positive and negative, respectively. On the other hand, if rectangular wave 30 were a square wave, with equal positive and negative portions, waves 88 and 90 would both have equal voltage reference lines with slight variations.

Waves 88 and 90 are applied to the grids of command tubes 92 and 94, respectively, which are direct current amplifier tubes. The respective outputs of command tubes 92 and 94, which are preferably from the plates of tubes 92 and 94, but which may be from the cathodes, are connected to opposite ends of a polarized relay 96 having an armature 98. Because of the phase reversal in command tubes 92 and 94, respectively, command tube 92 applies a less positive direct current voltage to the left side of relay 96 and command tube 94 applies a more positive direct current voltage to the right side of relay 96.

Contact members 100 and 102 of polarized relay 96 are connected to a roll servo 104, which in turn is mechanically coupled with the ailerons of the aircraft to be controlled. When contact member 100 is in contact with armature 98, roll servo 104 will turn in one direction, moving the ailerons of the aircraft so that the craft will roll in one direction, for example, to the right. On the other hand, when contact member 102 is in contact with armature 98, roll servo 104 will rotate in the opposite direction to so deflect the ailerons of the aircraft that the aircraft will roll in the opposite direction, for example, to the left.

If neither contact 100 nor contact 102 touches armature 98, roll servo 104 will not be actuated to move the ailerons of the plane.

When potentiometer arm 28 is moved to the right, as shown in Figure 1, so that rectangular wave 30 has a long positive portion and a short negative portion, command tubes 92 and 94 will apply a relatively negative potential to the left side of relay 96 and a relatively positive potential to the right side of relay 96, so that contact 100 touches armature 98 and causes roll servo 104 to so deflect the ailerons that the aircraft will rotate to the right. Roll servo 104 is mechanically linked to a servo-potentiometer 106 through the variable potentiometer contact 108. Rotation of roll servo 104 to move the ailerons so that the plane will roll to the right causes a movement of variable contact 108 to the left along potentiometer resistance 110. This in turn causes a decrease in the potential at the left end 112 of potentiometer 106, and a corresponding increase in the potential at the right end 114 of potentiometer 106. These changes in the potentials at points 112 and 114 are caused because potentiometer 106 forms a portion of a bridge network which also includes a pair of fixed bridge resistors 116 and 118 which are connected respectively to points 112 and 114, and which have their other ends connected to B-plus.

The roll servo 104 will continue to rotate and to thereby further deflect the ailerons until variable contact 108 of servo-potentiometer 106 is moved to the left a sufficient amount of equalize the voltages at the grids of command tubes 92 and 94, such equalization being permitted by connections between points 112 and 114 and the grids of the respective command tubes 92 and 94. This equalizes the voltages on the opposite sides of polarized relay 96, so that contact member 100 will no longer touch armature 98, and roll servo 104 will stop.

It can thus be seen that a small difference in the positive and negative portions of wave 30 will cause roll servo 104 to move variable contact 108 of potentiometer 106 only a slight amount before polarized relay 96 is equalized so that roll servo 104 is shut off. Thus, with a slight difference between the positive and negative portions of wave 30, roll servo 104 will only deflect the ailerons a slight amount, so that the aircraft will roll slowly. On the other hand, a large difference between the positive and negative portions of wave 30 will require a large movement of variable contact 108 to the left before the roll servo 104 is shut off, so that the ailerons will be deflected a large amount.

When potentiometer arm 28 is returned to the central position after having been moved to the right in the above manner, the inputs to command tubes 92 and 94 from integrating networks 84 and 86, respectively, will be equal. However, the bridge network will become out of balance again due to the positioning of variable contact 108 to the left on potentiometer resistor 110.

This unbalance of the bridge network is opposite to the prior unbalanced condition, so that roll servo 104 will return the ailerons to their normal, undeflected positions. At the time the ailerons have thus been moved back to normal, roll servo 104 will have moved variable contact 108 back to the right along resistor 110 a sufficient amount to re-establish the bridge balance, so that roll servo 104 will stop.

If potentiometer arm 28 is only partially returned to the central position from a right-hand position, the bridge network will become balanced before variable contact 108 reaches the center of resistor 110, so that roll servo 104 will only partially return the ailerons to their normal condition.

If the positive portion of wave 30 is shorter than the negative portion, roll servo 104 will rotate in the opposite direction and will cause the ailerons to be so deflected that the aircraft will roll to the left. In this situation, variable contact 108 will move to the right to equalize polarized relay 96 and thereby shut off roll servo 104.

The operation of my roll control channel 21 when rectangular wave 30 has a short positive portion and a long negative portion is the same as the operation of my pitch control channel 23 when such a wave is applied thereto. For this reason, I have shown a rectangular wave 48 in pitch control channel 23 which has a short positive portion and a long negative portion.

Pitch frequency filter 70 admits pitch frequency audio oscillations and rejects all roll and extraneous frequency oscillations. Thus, the output of pitch frequency filter 70 is a proportion modulated audio wave 122 which corresponds to proportion modulated audio wave 54. Detector 124 extracts rectangular wave 126 from proportion modulated audio wave 122. Rectangular wave 126 corresponds with rectangular wave 48 in Figure 1, being reversed in phase due to the action of detector 124.

A phase inverter 128 receives rectangular wave 126 from detector 124, and applies uninverted wave 130 and inverted wave 132 to rectifiers 133 and 135, which rectify the wave forms and pass them on to integrating networks 134 and 136, respectively. Integrating network 134 produces a relatively negative direct current voltage wave 138, with slight variations therein, and integrating network 136 produces a relatively positive direct current voltage wave 140, with slight variations therein.

Substantially direct current waves 138 and 140 are applied to the grids of command tubes 142 and 144, respectively. The outputs of command tubes 142 and 144, which are preferably from the plates of tubes 142 and 144, but which may be from the cathodes, are connected to opposite ends of polarized relay 146, having armature 148. The two contact members, 150 and 152 of polarized relay 146 are connected to pitch servo 154, which is mechanically linked to servo-potentiometer 156 through variable contact 158 of potentiometer 156.

Variable contact 158 of potentiometer 156 is adapted to slide in either direction along potentiometer resistance 160, having ends 162 and 164. Potentiometer 156 forms a part of a bridge network which also includes a pair of fixed bridge resistors 166 and 168 which are connected, respectively, to points 162 and 164. The other ends of fixed bridge resistors 166 and 168 are connected to a point 170 which in turn is connected to B-plus.

When rectangular wave 48 has equal positive and negative portions, wave 126 will also have equal positive and negative portions, so that the average direct current potential applied to command tubes 142 and 144 through integrating networks 134 and 136, respectively, will be equal, assuming arm 158 is centralized. Thus, relay 146 would not be actuated, so that pitch servo 154, in turn, would not be actuated. However, if potentiometer arm 46 in Figure 1 is moved to the left, as shown, rectangular wave 48 will have a shorter positive portion than its negative portion. Correspondingly, wave 126 will have a relatively short negative portion and a relatively long positive portion, so that a relatively negative direct current wave 138 will be applied to command tube 142 and a relatively positive direct current wave 140 will be applied to command tube 144. This will apply a relatively positive potential to the left side of relay 146 and a relatively negative potential to the right side of relay 146, whereby contact member 152 will come into contact with armature 148 and pitch servo 154 will so move the elevator that the aircraft will nose downward. Pitch servo 154 will at the same time, through its mechanical linkage with servo-potentiometer 156, cause potentiometer contact 158 to move to the right. This lowers the potential at the grid of command tube 144, and raises the potential at command tube 142, and thereby equalizes the potentials at opposite ends of relay 146 so that relay 146 is neutralized, and pitch servo 154 will stop.

The amount of deflection of the elevator to nose the plane downward is thus proportional to the distance which potentiometer arm 46 is moved to the left from the central point.

Since pitch control channel 23 operates in the same manner as roll control channel 21, if potentiometer arm 46 is moved to the right in Figure 1, there will be a proportional deflection of the elevator which causes the aircraft to nose upward.

Referring now to the portion of spare channel 57 which is in my air control unit 12, whenever spare channel audio oscillator 58 is turned on by closing switch 60, spare channel frequency filter 172 permits the spare channel audio oscillations to pass, and rejects all roll, pitch and extraneous frequency oscillations. The spare channel audio oscillations are amplified by audio amplifier 174 and then are rectified by rectifier 176. These continuous rectified spare channel audio oscillations actuate relay tube and relay 178. Output members 180 and 182 of relay tube and relay 178 may be connected to any device in the aircraft which is to be controlled by an on-off signal. For example, a smoke bomb may be connected to output members 180 and 182 so that the bomb will be released when switch 60 is closed.

Figure 3:
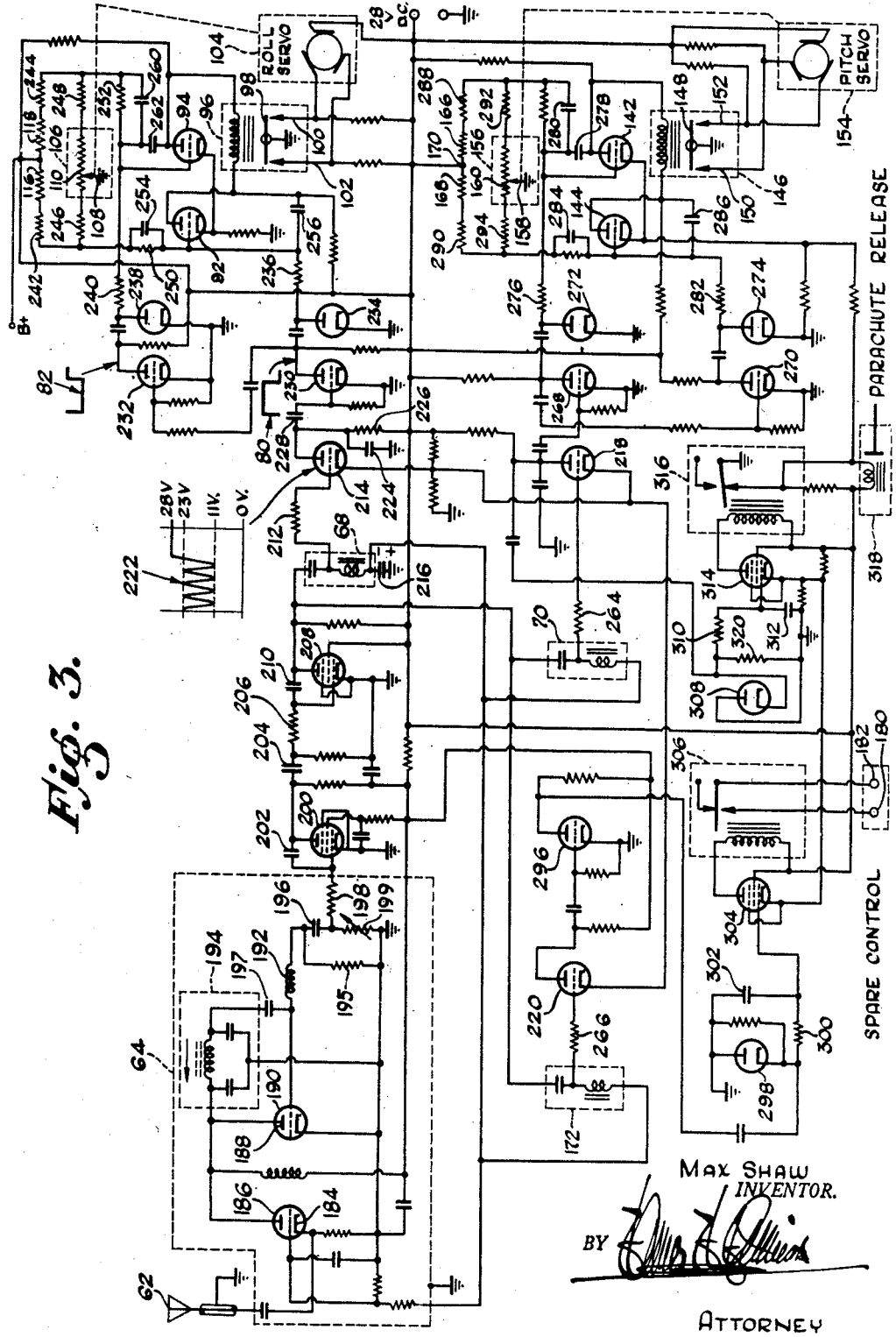
Figure 3 is a circuit diagram showing my air control unit which is shown in block diagram in Figure 2.

Referring to Figure 3 of the drawings, I will now describe the circuitry of my air control unit 12 which is shown in block diagram in Figure 2.

The signal sent out through antenna 56 (see Figure 1) of ground control unit 10 is picked up by air control unit antenna 62 (see Figures 2 and 3) from which the signal is conveyed to cathode 184 of grounded grid R. F. amplifier tube 186.

The amplified R. F. carrier wave then passes to plate 188 of superregenerative detector tube 190. A superregenerative detecting action occurs at tube 190, with the audio signal being taken from the grid circuit of tube 190 through R. F. choke 192. Tuned circuit 194 which is tuned to the frequency of R. F. transmitter 38, inter-connects the plate and grid of tube 190 to provide the superregeneration.

Prior art superregenerative detectors include resistor 195 and condenser 197, which cooperate to determine the quench rate of the detector and the percentage of time during which the R. F. oscillator portion of the circuit operates. Adjustment of resistor 195 and condenser 197 permits control over the sensitivity and stability of the circuit.

These prior art superregenerative detectors had the serious disadvantage that whenever circuit elements 195 and 197 were altered to change the quench frequency, the D. C. grid voltage for the superregenerative tube was altered, so that optimum conditions of quench frequency and grid voltage could not be achieved. For this reason, prior art superregenerative detectors were subject to overloading and were not sufficiently selective to prevent interference from adjacent stations.

My unique superregenerative detector differs from prior art superregenerative detectors by the addition of condenser 196 and resistor 199 between choke 192 and ground. Resistor 199 is variable and permits the direct current grid voltage to be adjusted substantially independently of the quench frequency. Condenser 196 blocks off direct current from resistor 199 to prevent resistor 199 from affecting the D. C. bias of tube 190.

One advantage of my superregenerative detector circuit is that individual control of the quench frequency voltage and of the quench frequency by adjustment of circuit elements 195 and 197 and individual control over the D. C. bias of the tube 190 by adjustment of resistor 199 permits optimum circuit operation to be achieved.

Another advantage of my superregenerative circuit is that the addition of elements 196 and 199 permits the D. C. bias on tube 190 to be raised higher than in prior art superregenerative detectors so that a higher quench frequency can be achieved. This makes the detector less sensitive to over-loading.

A further advantage of my superregenerative circuit is that the band of quench frequency oscillations may be accurately chopped off at both ends to produce a desired band width. This prevents multiple point response and the consequent distortion and interference from adjacent stations.

This completes the receiver 64 shown as a block in Figure 2. It is to be understood that any other suitable receiver may be used.

Referring now to audio amplifier 66, the audio signal passes from R. F. choke 192 through condenser 196 and coupling resistor 198 to the grid of audio frequency amplifier 200. High frequency degenerative feed-back condenser 202 which inter-connects the grid and plate of tube 200 prevents overloading of tube 200 by the quench frequency of superregenerative detector tube 190.

The signal then passes from tube 200 through coupling condenser 204 and coupling resistor 206 to the grid of audio power amplifier tube 208 which completes audio amplifier 66 of Figure 2. The plate and grid of tube 208 are connected by high frequency degenerative feed-back condenser 210 to further eliminate the quench frequency of tube 190.

The output of power amplifier tube 208 is connected to roll frequency filter 68, pitch frequency filter 70 and spare channel frequency filter 172. Roll frequency filter 68 permits the roll frequency audio oscillations to pass, and these oscillations are applied through equalizing resistor 212 to the grid of detector tube 214 which forms a part of detector 74 shown in Figure 2.

Current which flows from the cathode to the grid of detector tube 214 during the positive half-cycles of the roll frequency audio oscillations develops a voltage across equalizing resistor 212 and also develops a voltage across condenser 216 which inter-connects each of the filters 68, 70 and 172 to ground. As will be hereinafter further explained, the voltage across condenser 216 is used as a protective bias for pitch frequency detector tube 218 and spare channel audio amplifier tube 220. The voltage across condenser 216 also acts as an automatic volume control (A. V. C.) voltage for the grid of grounded grid R. F. amplifier tube 186, to prevent overloading of superregenerative detector tube 190 at high signal levels.

The wave form 222 which is produced at the plate of detector tube 214 is developed in the following manner: During the first part of a duty cycle when the audio signal is being passed through filter 68, tube 214 is saturated during the bottom portions of the audio frequency oscillations, and is cut off during the top portions of the audio oscillations. The plate of tube 214 does not go all the way up to B-plus voltage while the audio signal is being applied because of the fact that condenser 224 is being charged through plate resistor 226 of tube 214. Thus, where B-plus is 28 volts, during the audio oscillations, the plate of tube 214 will reach a maximum voltage of about 23 volts as is shown by wave form 222. At saturation, the plate will be at about 11 volts.

During the other part-cycle when no audio oscillations pass through filter 68, tube 214 is at cutoff. A half-cycle of the whole wave form has a frequency sufficiently lower than the audio frequency to permit condenser 224 to charge, so that the plate of tube 214 will be at B-plus, or 28 volts.

Wave form 222 passes through condenser 228 to the grid of limiter tube 230. A portion of the output of limiter tube 230 is applied from the plate of tube 230 to the grid of phase inverter tube 232 which reverses the phase thereof and also operates to further limit the amplitude of the wave form which it receives.

During the first portion of a complete duty cycle the plate voltage of tube 214 is always sufficiently low to cut off tube 230, so that the plate of tube 230 will be at B-plus. However, during the portion of a complete duty cycle when tube 214 is cut off, the grid of tube 230 is at zero volts, so that tube 230 is saturated, and the voltage of the plate of tube 230 will be much lower than B-plus, and will be at a constant value during this portion of the duty cycle. Thus, square wave 80 is produced at the plate of 230.

By utilizing both grid limiting and plate limiting in the above manner, tube 230 produces a square wave of exactly the same amplitude regardless of the amplitude of the audio signal which passes through filter 68.

Tube 232 is similar to tube 230, so that it further limits, by both grid and plate limiting, the signal which it receives from 230. By applying the plate signal of tube 230 to the grid of tube 232, the output at the plate of tube 232 is wave form 82, which is an inversion of wave form 80.

Uninverted wave form 80 passes to shunt rectifier tube 234 and through resistor 236 to the grid of command tube 92. Similarly, inverted wave form 82 passes to shunt rectifier tube 238, resistor 240 and then to the grid of command tube 94.

Since the cathodes of rectifier tubes 234 and 238, which are diodes, are grounded, the signals provided to the grids of command tubes 92 and 94 are pulsating negative signals.

In addition to the negative signals from tubes 234 and 238, the grids of tubes 92 and 94 are provided with positive voltages from the bridge network consisting of fixed bridge resistors 116 and 118, potentiometer 106, and additional bridge resistors 242, 244, 246 and 248. These positive voltages to the grids of tubes 92 and 94 will be equal when variable contact 108 of potentiometer 106 is centered, but when roll servo 104 moves contact 108 to the left, this potential at the grid of tube 92 is lowered, and the potential at the grid of tube 94 is raised. Conversely, when roll servo 104 moves contact 108 to the right, the potential at the grid of tube 92 is raised.

Resistor 236 and resistor 250 provide a mixing circuit which combines the negative voltage from tube 234 and the positive voltage from the bridge circuit at the grid of tube 92. Similarly, resistors 240 and 252 form a mixing circuit to combine the signal from tube 238 and the positive voltage from the right side of the bridge at the grid of tube 94.

Resistor 236, coupled with condensers 254 and 256, form integrating network 84. Similarly, resistor 240, coupled with condensers 260 and 262 form integrating network 86.

Integrating networks 84 and 86 render the respective outputs of direct current amplifier command tubes 92 and 94 substantially direct current.

Lack of infinite sensitivity of polarized relay 96 would cause a slight lag in the response of air control unit 12 to a variation in the relative positive and negative portions of the pulse in ground control unit 10. For example, a voltage difference of .1 volts may be necessary across relay 106 to actuate relay 106. To eliminate this lag in the response of air control unit 12, I provide integrating network circuit elements for integrating networks 84 and 86 which are of such a value that the integrated waves provided at polarized relay 96 will have an alternating current component of substantially the same amplitude as the dead zone of relay 96, e. g. .1 volts. This is a self-generated dither voltage which causes actuation of polarized relay 96 and hence roll servo 104, in response to the slightest variation of potentiometer arm 28.

Wave forms 88 and 90 in Figure 2, which are actually inverted when they are applied to relay 96, clearly illustrate the A. C. component of the D. C. voltage which acts as a dither voltage.

This self-generated dither voltage also acts as an anticipation control by causing relay 96 to operate intermittently in accordance with the alternating current dither voltage when roll servo 104 is moving variable contact 108 to a position to balance the bridge network. By this means, roll servo 104 will ease to a stop when variable contact 108 approaches a position that will balance the bridge, instead of moving variable contact 108 beyond the balancing position which would cause servo 104 to hunt.

I provide a second anticipation control in addition to my dither control. My bridge circuit has a sufficiently low impedance that when a large command is given and roll servo 104 accordingly moves variable contact 108, the resulting voltage shift across the bridge circuit is differentiated applying the full voltage change to the grids of tubes 92 and 94 immediately.

This latter anticipation control becomes more effective with increases in the speed of the servo. Alteration of the sizes of condensers 254 and 260 will change the amount of this anticipation control which is applied.

By using the relatively coarse anticipation control of condensers 254 and 260, together with the fine and accurate anticipation control provided by the dither, servo 104 will always ease to a stop at the correct point regardless of the size or speed of the command given.

Having described roll control channel 21 I will now describe pitch control channel 23. Pitch frequency filter 70 permits the pitch frequency audio oscillations to pass and these oscillations are fed into pitch frequency detector tube 218, which operates in exactly the same manner as roll frequency detector tube 214.

A back bias is applied to the grid of detector tube 218 by the potential which builds up across condenser 216. This operates to completely block off any small amount of the roll frequency which may pass through filter 70. For example, if a roll frequency audio signal of ten (10) volts A. C. is produced at the output of roll frequency filter 68, ten (10) volts will build up across condenser 216. The peak voltage of fourteen and fourteen hundredths (14.14) volts of this ten (10) volt A. C. roll frequency audio signal will not be applied across condenser 216 because of the limiting action of equalizing resistor 212. While this roll frequency audio signal is being applied, a ten (10) volt bias is thus provided at the grid of tube 218. If a small amount of unwanted roll frequency audio signal, such as one (1) volt, passes through filter 70, this ten (10) volt bias will completely block such unwanted signal. However, if a normal pitch frequency audio signal of about nine (9) volts appears at the output of filter 70, this nine (9) volt signal would have a peak of about thirteen (13) volts, which as sufficient to saturate tube 218 in spite of the ten (10) volt back bias.

Equalizing resistor 264 between filter 70 and tube 218 functions in exactly the same manner with respect to pitch control channel 23 as does resistor 212 with respect to roll control channel 21. Thus, when audio signal is applied to pitch control channel 23, a back bias will be applied to roll frequency detector tube 214.

In a similar manner, either a roll frequency audio signal or a pitch frequency audio signal will provide a back bias to spare channel audio amplifier tube 220, and spare channel audio oscillations will provide a back bias to tubes 214 and 218, with spare channel equalizing resistor 266 operating in the same manner as equalizing resistors 212 and 264.

The signal from tube 218 is fed into the grid of limiter tube 268, which operates in the same manner as limiter 230. A portion of the plate signal from limiter tube 268 is conveyed to phase inverter tube 270, which acts as an additional limiter and which inverts the wave form at the plate of tube 268.

The wave forms at the plates of tubes 268 and 270 are rectified by shunt rectifier diodes 272 and 274, respectively, and are applied to the grids of command tubes 142 and 144, respectively.

Integrating network 134 for command tube 142 consists of resistor 276, condenser 278 and condenser 280. Similarly, resistor 282, condenser 284 and condenser 286 form integrating network 136 for command tube 144.

The bridge for pitch control channel 23 includes potentiometer 156, fixed bridge resistors 166 and 168, and additional bridge resistors 288, 290, 292 and 294.

Command tubes 142 and 144, polarized relay 146, pitch servo 154 and servo-potentiometer 156 operate in exactly the same manner as the corresponding elements of roll control channel 21.

Referring now to my spare channel, filter 172 permits the spare channel audio oscillations to be applied to spare channel audio amplifier tube 220 through equalizing resistor 266. The output of tube 220 is fed into an additional audio amplifier tube 296, tubes 220 and 296, together forming audio amplifier 174 shown in Figure 2.

The amplied audio signal from tube 296 is then rectified by shunt rectifier tube 298 which has its plate grounded. Tube 298, together with resistor 300 and condenser 302 constitute rectifier 176 of Figure 2, which provides a steady D. C. voltages at the control grid of relay tube 304.

Relay 306 is normally open so that output members 180 and 182 are not provided with a signal. This normally open position of relay 306 is permitted by biasing tube 304 to cutoff.

When a spare channel audio signal is applied, tube 304 will conduct, so that relay 306 will be closed and output members 180 and 182 will actuate whatever spare channel mechanism is employed, such as a smoke bomb. An additional servo motor may be actuated through output members 180 and 182.

I provide a parachute release system which is adapted to release a parachute whenever the pulsing in pitch control channel 23 ceases.

The signal at the plate of pitch detector tube 218 is conveyed to rectifier tube 308 at which this signal is shunt rectified to produce a pulsating positive voltage. This pulsating positive voltage is filtered by resistor 310 and condenser 312 to produce a steady positive voltage at the control grid of relay tube 314, which therefore normally draws current and keeps parachute relay 316 actuated so that parachute release 318 will be held fast.

Whenever the pitch frequency signal ceases for any reason, tube 314 will cease to draw current and parachute relay 316 will be opened, releasing the parachute through parachute release 318.

In order that merely momentary losses of the pitch frequency signal will not release the parachute, I provide resistor 320 between the plate and cathode of tube 308, which, together with resistor 310 and condenser 312 forms a slow discharge circuit. This creates approximately a one second time lag between the loss of the pitch frequency signal and the actuation of parachute release 318.

Although I have shown my parachute release mechanism as actuated by pitch control channel 23, the parachute mechanism may be utilized in connection with roll control channel 21, or in connection with any additional control channels which I may provide.

Although parachute release 318 is adapted to release the parachute when the signal in a single control channel ceases, it is obvious that if the entire R. F. carrier goes out, the parachute will also be released, because no pitch frequency signal will be present in air control unit 12.

Figure 4 illustrates an alternative embodiment of my air control unit 12. The spare channel circuits in this embodiment of my invention are identical to those used in the preferred embodiment of my invention shown in Figures 2 and 3. Also, the receiver 64, audio amplifier 66 and the roll control channel 21 and pitch control channel 23 up to the inputs to the command tubes have exactly the same circuit elements as in my preferred embodiment.

The essential difference between the alternative embodiment of my invention shown in Figure 4 and the preferred embodiment of my invention shown in Figures 2 and 3 is the use of the command tubes.

Referring now to the roll control channel of my alternative embodiment, the outputs of integrating networks 84 and 86 are connected to the inputs of command tubes 322 and 324, respectively. Command tubes 322 and 324 are connected in series, in opposing relationship to each other, with servo-potentiometer 326 interposed between them. Although I prefer to connect the cathodes of tubes 322 and 324 to potentiometer 326, the plates of tubes 322 and 324 may be connected to potentiometer 326 instead.

Command tubes 322 and 324, together with servo-potentiometer 326, form two legs of a bridge network, the other two legs comprising the halves of center-tapped bridge resistor 328.

Command tubes 322 and 324 function as variable resistors instead of merely as D. C. amplifiers like command tubes 92 and 94. When the positive and negative portions of rectangular wave 30 in Figure 1 are equal, equal signals will be applied to command tubes 322 and 324, so that these tubes will have the same resistance. Under this condition, the bridge circuit is balanced so that polarized relay 330 is unactuated and roll servo 332 remains stationary.

If potentiometer arm 28 in Figure 1 is moved so that the positive portion of wave 30 is longer than the negative portion, the previously perfect balance of the bridge circuit is upset by a decrease in the resistance of command tube 322 and an increase in the resistance of command tube 324. This causes current to flow through polarized relay 330 so that contact 334 of relay 330 will touch armature 336 to cause roll servo 332 to so deflect the ailerons that the aircraft will roll to the right.

Mechanical linkage between servo 332 and variable contact 338 of potentiometer 326 causes contact 338 to move to the right along potentiometer resistor 340 until the bridge circuit is again balanced, so that relay 330 will be unactuated and roll servo 332 will stop.

On the other hand, if potentiometer arm 28 is moved to the left in Figure 1, so that the wave 30 has a relatively short positive portion and a relatively long negative portion, contact 342 of relay 330 will touch armature 336 so that roll servo 332 will cause the aircraft to roll to the left. Roll servo 332 will stop as soon as it has moved variable contact 338 sufficiently to the left along resistor 340 to balance the bridge circuit.

I provide a self-generated dither in my alternative embodiment in the same manner as in the preferred embodiment of my invention.

Pitch control channel 23 operates in the same manner as roll control channel 21.

Command tubes 344 and 346 of pitch control channel 23, together with servo-potentiometer 348 form two legs of the pitch control channel bridge circuit, while the halves of center-tapped fixed bridge resistor 350 form the other two legs of the bridge.

Pitch servo 354 is operated by polarized relay 352 in the same manner that roll servo 332 is operated by relay 330, and pitch servo 354 is mechanically connected to variable contact 356 of potentiometer 348 so that movement of pitch servo 354 will re-establish the bridge balance in the same manner that roll servo 332 re-establishes the balance of the roll control channel bridge.

Referring to Figure 5, I provide a control box 358 which is associated with ground control unit 10 and which has the necessary control elements to permit the operator to fly the aircraft.

The primary control element of control box 358 is control stick 360 which is universally mounted in box 358. Control stick 360 is connected to potentiometer arm 28 of potentiometer 26, shown in Figure 1, so that movement of control stick 360 to the left along roll axis 362 will move potentiometer arm 28 to the left, and movement of control stick 360 to the right along roll axis 362 will move potentiometer arm 28 to the right.

Similarly, movement of control stick 360 to the left along pitch axis 364, which is at right angles to roll axis 362, causes potentiometer arm 46 to move to the left, and movement of control stick 360 to the right along pitch axis 364 causes arm 46 of potentiometer 44 to move to the right.

Movement of stick 360 having components along both roll axis 362 and pitch axis 364 will cause simultaneous movement of potentiometer arms 28 and 46.

Additional control levers (not shown) may be provided on control box 358 if additional channels are employed in my proportional control system. Such additional channels can be used to control the aircraft rudder, trimmers, or any other moveable part of the aircraft. However, I have found that the use of only two proportional control channels, roll control channel 21 and pitch control channel 23, provides sufficient control over the aircraft to use the craft as an air target.

When the aircraft is being flown in level flight, control stick 360 is in the neutral position shown in Figure 5. This centralizes potentiometer arms 28 and 46 shown in Figure 1, so that waves 30 and 48 each have equal positive and negative portions. This causes an equal signal to be provided to command tubes 92 and 94, and at command tubes 142 and 144 so that polarized relays 96 and 146 are not actuated. This leaves servos 104 and 154 in their central positions and thus, the ailerons and elevator of the aircraft are adjusted for level flight.

If it is desired to roll the aircraft to the right, stick 360 is moved to the right which moves potentiometer arm 28 to the right and makes the positive portion of wave 30 longer than the negative portion. This causes an unequal signal to be applied to command tubes 92 and 94, which actuates relay 96 and roll-servo 104 to roll the aircraft to the right.

The amount of deflection of the ailerons will be proportional to the amount of deflection of stick 360, thus producing proportional control over the aircraft ailerons.

Further, the rate at which the ailerons move in response to movement of stick 360 will correspond to the rate of movement of stick 360 for all movements of stick 360 which do not cause servo 104 to move at its maximum speed. However, since the rate of deflection of the aircraft control surfaces corresponds with the speed of the servo, an increase in the rate of movement of stick 360 over that necessary to cause maximum servo speed will not increase the rate of deflection of the control surfaces.

In order to move the ailerons back to the neutral position so that the aircraft will not further roll, it is only necessary to move stick 360 back to the position shown in Figure 5. When this is done, the positive and negative portions of wave 30 become equal so that command tubes 92 and 94 have equal inputs from integrating networks 84 and 86, respectively. The lack of balance in the bridge network due to the positioning of variable contact 108 to the left causes roll servo 104 to move the ailerons back to the normal position.

If it is desired to roll the aircraft to the left, stick 360 is moved to the left along roll axis 362 until the ailerons have moved the desired proportional amount to roll the plane to the left. The ailerons may again be neutralized by merely moving the stick 360 back to its central position.

By moving stick 360 along pitch axis 364, the elevators will so move in proportion to the amount of movement of stick 360 that the aircraft will nose downward or nose upward, respectively. The rate at which the position of the elevators is varied will correspond to the rate of movement of stick 360 along pitch axis 364 when pitch servo 154 is not moving at its maximum speed.

By moving stick 360 in the above manner, the person on the ground can control the flight of the aircraft in the same manner as a pilot within the craft could control it.

An important advantage of my proportional control system over the prior art is that the aircraft surfaces controlled by my proportional control channels may be moved to an infinite number of different positions. This permits the aircraft to be much more accurately controlled than do "stepped" remote control systems.

I also achieve much more flexible control in my invention than prior art remote control systems by moving the aircraft surfaces at a rate of speed which corresponds to the rate of movement of the stick 360.

Being able to adjust the ailerons and the elevator of the aircraft in an infinite number of variations permits me to "trim" the ailerons and the elevator so that the aircraft will fly in a perfectly balanced level flight when stick 360 is released and is thereby returned to its neutral position, as shown in Figure 5, by conventional stick neutralizing springs (not shown). I apply this "trim" through roll trim knob 370 and pitch trim knob 368.

If it is desired, spare channel on-off switch 60 may be placed on control box 358 in the manner shown in Figure 5. Also, a switch 366 may be placed on control box 358 to permit either the pitch channel audio oscillations or the R. F. carrier wave to be turned off so that parachute release 318 may be intentionally operated to release the parachute.

Although my self-generated dither voltage is hereinabove described in connection with my proportional control receiver unit, it is to be understood that my self-generated dither may be employed in any accurate proportion modulation receiver unit. For example, my self-generated dither will operate in the above-described manner if employed in the concurrently filed application of Basil V. Deltour, Serial No. 311,089, for "Pulse Autopilot System."

It is to be understood that the form of my invention herein shown and described is my preferred embodiment and that various changes in the shape, size and arrangement of parts may be resorted to without departing from the spirit of my invention or the scope of the appended claims.

I claim:

1. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a direct current command which varies substantially in proportion to the length of said variable length signal frequency pulses, relay means operatively connected to said integrating circuit means and operable in response to said direct current command, an operating mechanism operatively connected to said relay means and operable in response to said relay means, and follow-up means operatively connected to said operating mechanism for reducing said direct current command when said operating mechanism moves in response to said command.

2. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a direct current command which varies substantially in proportion to the length of said variable length signal frequency pulses, relay means operatively connected to said integrating circuit means and operable in response to said direct current command, an operating mechanism operatively connected to said relay means and operable in response to said relay means, said relay means being selectively movable by said direct current command between one position in which it causes actuation of said operating mechanism in one direction, and another position in which it causes actuation of said operating mechanism in the opposite direction, and follow-up means operatively connected to said operating mechanism for reducing said direct current command when said operating mechanism moves in response to said command.

3. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a direct current command which varies substantially in proportion to the length of said variable length signal frequency pulses, a polarized relay operatively connected to said integrating circuit means and selectively movable by said direct current command between opposed positions, an operating mechanism operatively connected to said relay and movable in one direction when said relay is in one of its opposed positions and in the other direction when said relay is in the other of its opposed positions, and follow-up means operatively connected to said operating mechanism for reducing said direct current command when said operating mechanism moves in response to said command.

4. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a direct current command which varies substantially in proportion to the length of said variable length signal frequency pulses, a polarized relay operatively connected to said integrating circuit means and selectively movable by said direct current command between opposed positions, an operating mechanism operatively connected to said relay and movable in one direction when said relay is in one of its opposed positions and the other direction when said relay is in the other of its opposed positions, said relay being at its balanced position when variable length signal frequency pulses have a time duration of substantially one-half of a full signal frequency cycle, and follow-up means operatively connected to said operating mechanism for reducing said direct current command when said operating mechanism moves in response to said command.

5. In a remote control system utilizing a carrier frequency modulated with variable length signal frequency pulses of substantially constant pulse repetition rate, a receiver unit including a signal frequency detector circuit, a rectangular wave detector circuit operatively connected to said signal frequency detector, integrating circuit means operatively connected to said signal frequency detector for providing a direct current command which varies substantially in proportion to the ratio between the time durations of the positive and negative portions of the rectangular wave provided by said rectangular wave detector, relay means operatively connected to said integrating circuit means and selectively movable by said direct current command between opposed positions, an operating mechanism operatively connected to said relay means and movable in one direction when said relay means is in one of its opposed positions and in the other direction when said relay means is in the other of its opposed positions, and follow-up means operatively connected to said operating mechanism for reducing said direct current command when said operating mechanism moves in response to said command.

6. In a remote control system utilizing a carrier frequency modulated with variable length signal frequency pulses of substantially constant pulse repetition rate, a receiver unit including a signal frequency detector circuit, a rectangular wave detector circuit operatively connected to said signal frequency detector, integrating circuit means operatively connected to said signal frequency detector for providing a direct current command which varies substantially in proportion to the ratio between the time durations of the positive and negative portions of the rectangular wave provided by said rectangular wave detector, relay means operatively connected to said integrating circuit means and selectively movable by said direct current command between opposed positions, an operating mechanism operatively connected to said relay means and movable in one direction when said relay means is in one of its opposed positions and in the other direction when said relay means is in the other of its opposed positions, said relay means being at a balance between its said opposed positions when said rectangular wave has substantially equal positive and negative portions, and follow-up means operatively connected to said operating mechanism for reducing said direct current command when said operating mechanism moves in response to said command.

7. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a pair of direct current commands which vary, respectively, substantially directly and inversely proportionally to the length of said variable length signal frequency pulses, relay means operatively connected to said integrating circuit means to provide the respective said direct current commands to opposite sides of said relay means whereby said relay means is movable to one position when one of said commands is greater than the other and movable to another position when the relative amplitude of said direct current commands is reversed, and an operating mechanism operatively connected to said relay means and movable in one direction when said relay means is in one of its said positions and in the other direction when said relay means is in its other said position, and follow-up means operatively connected to said operating mechanism for reducing said direct current commands when said operating mechanism moves in response to said commands.

8. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the input members of the respective said command tubes, relay means having its opposite sides operatively connected to the output members of the respective said command tubes whereby said relay means is movable to one position when one of said direct current commands is greater than the other and movable to another position when the relative amplitude of said direct current commands is reversed, and an operating mechanism operatively connected to said relay means and movable in one direction when said relay means is in one of its said positions and in the other direction when said relay means is in its other said position, and follow-up means operatively connected to said operating mechanism and to the input members of said command tubes for reducing said direct current commands when said operating mechanism moves in response to said commands.

9. In a remote control system utilizing a carrier frequency modulated with variable length signal frequency pulses of substantially constant pulse repetition rate, a receiver unit including a signal frequency detector circuit, a rectangular wave detector circuit operatively connected to said signal frequency detector, integrating circuit means operatively connected to said rectangular wave detector for providing a pair of direct current commands, one of which varies substantially in proportion to the time duration of the positive portion of said rectangular wave and the other of which varies substantially in proportion to the time duration of the negative portion of said rectangular wave, relay means operatively connected to said integrating circuit means to provide the respective said direct current commands to opposite sides of said relay means whereby said relay means is movable to one position when one of said direct current commands is greater than the other and movable to another position when the relative amplitudes of said direct current commands are reversed, an operating mechanism operatively connected to said relay means and movable in one direction when said relay means is in one of its said positions and in the other direction when said relay means is in its other said position, and follow-up means operatively connected to said operating mechanism for reducing said direct current commands when said operating mechanism moves in response to said commands.

10. In a remote control system utilizing a carrier frequency modulated with variable length signal frequency pulses of substantially constant pulse repetition rate, a receiver unit including a signal frequency detector circuit, a rectangular wave detector circuit operatively connected to said signal frequency detector, integrating circuit means operatively connected to said rectangular wave detector for providing a pair of direct current commands, one of which varies substantially in proportion to the time duration of the positive portion of said rectangular wave and the other of which varies substantially in proportion to the time duration of the negative portion of said rectangular wave, a pair of command tubes operatively connected to said integrating circuit means to provide the respective said direct current commands to the input members of the respective said command tubes, relay means having its opposite sides operatively connected to the output members of the respective said command tubes whereby said relay means is movable to one position when one of said direct current commands is greater than the other and movable to another position when the relative amplitudes of said direct current commands are reversed, an operating mechanism operatively connected to said relay means and movable in one direction when said relay means is in one of its said positions and in the other direction when said relay means is in its other said position, and follow-up means operatively connected to said operating mechanism and to the input members of said command tubes for reducing said direct current 11. In a remote control system utilizing a carrier frequency modulated with variable length signal frequency pulses of substantially constant pulse repetition rate, a receiver unit including a signal frequency detector circuit, a limiter tube operatively connected to said signal frequency detector for limiting the amplitude of the detected wave, integrating circuit means operatively connected to said limiter tube for providing a direct current command which varies substantially in proportion to the length of said variable length signal frequency pulses, relay means operatively connected to said integrating circuit means and operable in response to said direct current command, an operating mechanism operatively connected to said relay means and operable in response to said relay means, and follow-up means operatively connected to said operating mechanism for reducing said direct current command when said operating mechanism moves in response to said command.

12. In a remote control system utilizing a carrier frequency modulated with variable length signal frequency pulses of substantially constant pulse repetition rate, a receiver unit including a signal frequency detector circuit, a limiter tube operatively connected to said signal frequency detector for limiting the amplitude of the detected wave, integrating circuit means operatively connected to said limiter tube for providing a direct current command which varies substantially in proportion to the length of said variable length signal frequency pulses, relay means operatively connected to said integrating circuit means and operable in response to said direct current command, an operating mechanism operatively connected to said relay means and operable in response to said relay means, said relay means being selectively movable by said direct current command between one position in which it causes actuation of said operating mechanism in one direction and another position in which it causes actuaton of said operating mechanism in the opposite direction, and follow-up means operatively connected to said operating mechanism for reducing said direct current command when said operating mechanism moves in response to said command.

13. In a remote control system utilizing a carrier frequency modulated with variable length signal frequency pulses of substantially constant pulse repetition rate, a receiver unit including a signal frequency detector circuit, a rectangular wave detector operatively connected to said signal frequency detector, a limiter tube operatively connected to said signal frequency detector for limiting the amplitude of said rectangular wave, integrating circuit means operatively connected to said limiter tube for providing a direct current command which varies substantially in proportion to the ratio between the time durations of the positive and negative portions of the rectangular wave provided by said rectangular wave detector, relay means operatively connected to said integrating circuit means and selectively movable by said direct current command between opposed positions, an operating mechanism operatively connected to said relay means and movable in one direction when said relay means is in one of its opposed positions and in the other direction when said relay means is in the other of its opposed positions, and follow-up means operatively connected to said operating mechanism for reducing said direct current command when said operating mechanism moves in response to said command.

14. In a multiple channel remote control system utilizing a carrier frequency modulated with a plurality of signal frequency waves each of which comprises variable length signal frequency pulses of substantially constant pulse repetition rate, a receiver unit including a signal frequency detector circuit, filter means associated with each channel operatively connected to said signal frequency detector to isolate the respective said signal frequency waves, integrating circuit means operatively connected to the said filter means of each channel for providing a direct current command in each channel which varies substantially in proportion to the length of said variable length signal frequency pulses in the respective channel, relay means operatively connected to said integrating circuit means in each channel and operable in response to said direct current command in the respective channel, an operating mechanism operatively connected to the respective said relay means in each channel and operable in response to the respective said relay means, and follow-up means operatively connected to said operating mechanism in each channel for reducing the respective said direct current command when said operating mechanism moves in response to said command.

15. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a direct current command which varies substantially in proportion to the length of said variable length signal frequency pulses, relay means operatively connected to said integrating circuit means and operable in response to said direct current command, an operating mechanism operatively connected to said relay means and operable in response to said relay means, and follow-up means operatively connected to said operating mechanism for reducing said direct current command when said operating mechanism moves in response to said command, said integrating circuit means including circuit elements for passing a small amplitude of the pulse frequency oscillations to provide a dither voltage to said relay to substantially eliminate the dead zone of the relay.

16. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a direct current command which varies substantially in proportion to the length of said variable length signal frequency pulses, relay means operatively connected to said integrating circuit means and operable in response to said direct current command, an operating mechanism operatively connected to said relay means and operable in response to said relay means, said relay means being selectively movable by said direct current command between one position in which it causes actuation of said operating mechanism in one direction and another position in which it causes actuation of said operating mechanism in the opposite direction, and follow-up means operatively connected to said operating mechanism for reducing said direct current command when said operating mechanism moves in response to said command, said integrating circuit means including circuit elements for passing a small amplitude of the pulse frequency oscillations to provide a dither voltage to said relay to substantially eliminate the dead zone of said relay in movements between its said two positions.

17. In a remote control system utilizing a carrier frequency modulated with variable length signal frequency pulses of substantially constant pule repetition rate, a receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective command tubes, relay means having its respective opposite sides operatively connected to the same primary tube element of the respective said command tubes whereby said relay means is movable to one position when one of said direct current commands is greater than the other and movable to another position when the relative amplitudes of said direct current commands are reversed, an operating mechanism operatively connected to said relay means and movable in one direction when said relay means is in one of its said positions and in the other direction when said relay means is in its other said position, and follow-up means including a potentiometer actuated by said operating mechanism and having its opposite ends operatively connected to the respective said control grids for reducing said commands when said operating mechanism moves in response to said commands.

18. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective said command tubes, relay means having its respective opposite sides operatively connected to the plates of the respective said command tubes whereby said relay means is movable to one position when one of said direct current commands is greater than the other and movable to another position when the relative amplitudes of said direct current commands are reversed, an operating mechanism operatively connected to said relay means and movable in one direction when said relay means is in one of its said positions and in the other direction when said relay means is in its other said position, and follow-up means including a potentiometer actuated by said operating mechanism and having its opposite ends operatively connected to the respective said control grids for reducing said commands when said operating mechanism moves in response to said commands.

19. In a remote control system untilizing a carrier frequency modulated with variable length signal frequency pulses of substantially constant pulse repetition rate, a receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective command tubes, relay means having its respective opposite sides operatively connected to the same primary tube element of the respective said command tubes whereby said relay means is movable to one position when one of said direct current commands is greater than the other and movable to another position when the relative amplitudes of said direct current commands are reversed, an operating mechanism operatively connected to said relay means and movable in one direction when said relay means is in one of its said positions and in the other direction when said relay means is in its other said position, and follow-up means including a potentiometer actuated by said operating mechanism and having its opposite ends operatively connected to the respective said control grids for reducing said commands when said operating mechanism moves in response to said commands, said operative connections between said potentiometer and said control grids having a low impedance for relatively high rates of voltage change in order to provide an anticipation control.

20. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective said command tubes, relay means having its respective opposite sides operatively connected to the same primary tube element of the respective said command tubes whereby said relay means is movable to one position when one of said direct current commands is greater than the other and movable to another position when the relative amplitudes of said direct current commands are reversed, an operating mechanism operatively connected to said relay means and movable in one direction when said relay means is in one of said positions and in the other direction when said relay means is in its other said position, and follow-up means including a potentiometer actuated by said operating mechanism and having its opposite ends operatively connected to the other primary tube element of the respective said command tubes for reducing said commands when said operating mechanism moves in response to said commands.

21. In a remote control system utilizing a carrier frequency modulated with variable length signal frequency pulses of substantially constant pulse repetition rate, a receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective said command tubes, relay means having its respective opposite sides operatively connected to the plates of the respective said command tubes whereby said relay means is movable to one position when one of said direct current commands is greater than the other and movable to another position when the relative amplitudes of said direct current commands is reversed, an operating mechanism operatively connected to said relay means and movable in one direction when said relay means is in one of its said positions and in the other direction when said relay means is in its other said position, and follow-up means including a potentiometer actuated by said operating mechanism and having its opposite ends operatively connected to the cathodes of the respective said command tubes for reducing said commands when said operating mechanism moves in response to said commands.

References Cited in the file of this patent

UNITED STATES PATENTS

| 2,532,723 | Knoop | Dec. 5, 1950 |
|---|---|---|
| 2,576,642 | Richman | Nov. 27, 1951 |
| 2,605,398 | Williams | July 29, 1952 |
| 2,613,339 | Palmer | Oct. 7, 1952 |
| 2,616,031 | Nosker | Oct. 28, 1952 |
| 2,632,135 | Carpenter | Mar. 17, 1953 |
| 2,634,414 | Andrew | Apr. 7, 1953 |